Dec. 23, 1969  D. T. O'CONNOR  3,485,088
FLUID COUPLED ULTRASONIC TRANSDUCER UNIT
Filed May 27, 1966
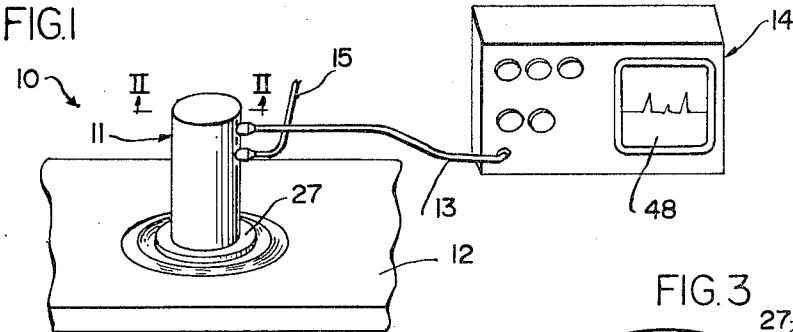
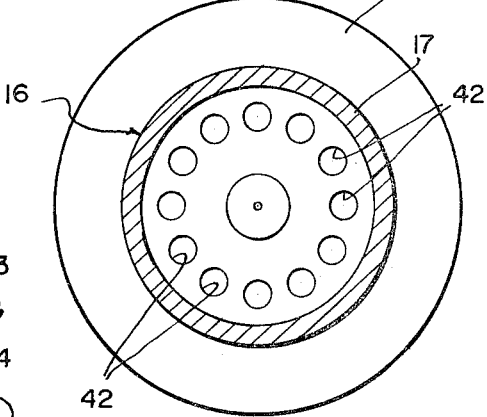
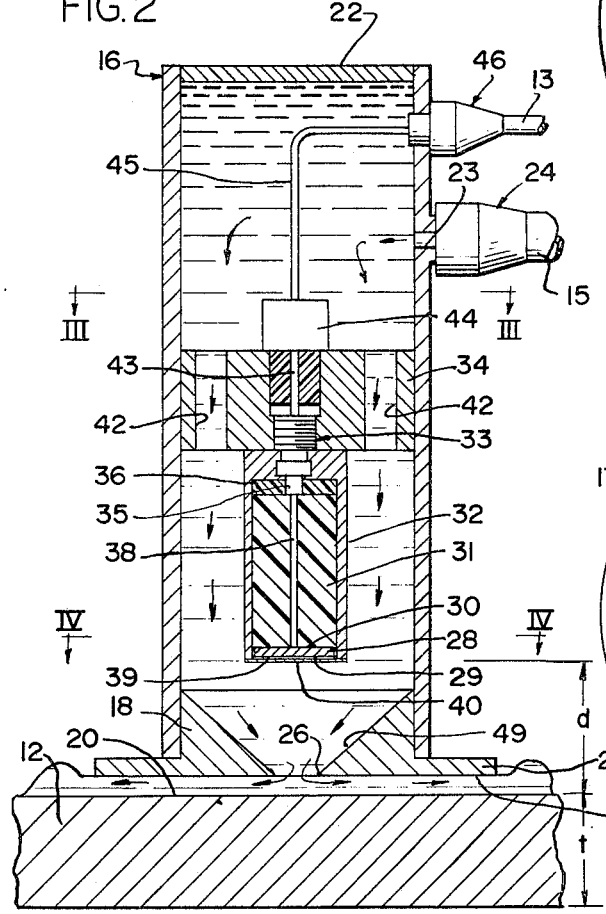
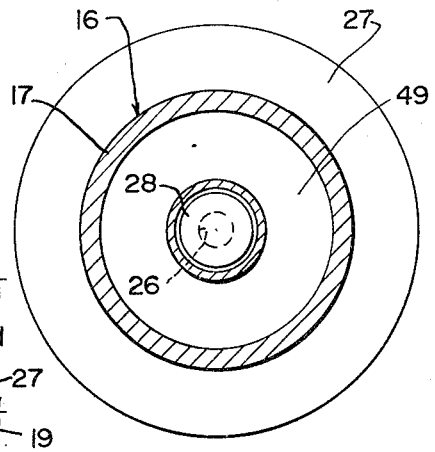
INVENTOR
DONALD T. O'CONNOR
ATTORNEYS United States Patent Office 3,485,088
Patented Dec. 23, 1969

3,485,088
FLUID COUPLED ULTRASONIC TRANSDUCER UNIT
Donald T. O'Connor, Barrington, Ill., assignor to Magnaflux Corporation, Chicago, Ill., a corporation of Delaware
Filed May 27, 1966, Ser. No. 553,523
Int. Cl. G01n 9/24
U.S. Cl. 73—67.8                    10 Claims

ABSTRACT OF THE DISCLOSURE

An ultrasonic transducer unit for testing a workpiece to measure dimensions or detect defects therein includes a surface of substantial area, with a small central opening therein, facing a surface portion of a moving workpiece, such as a high temperature workpiece, with a narrow spacing established between the surfaces such that the unit is uniformly fluid-coupled to the workpiece surface. The narrow spacing, when established, is automatically maintained by a balancing action primarily between static pressure created by coupling fluid, upon pressurized flow from the central opening in the facing surface, being forced radially outwardly between the facing surface of the unit and the workpiece surface such that the unit may be forced away from the workpiece surface and dynamic pressure created by the rapid movement of the coupling fluid between the two surfaces such that the unit may be moved toward the workpiece surface.

---

This invention relates to a fluid-coupled ultrasonic transducer unit and more particularly to a unit for the testing of parts to measure dimensions or detect defects therein, having fluid coupling means arranged to hold the transducer in fixed relation to a part and to automatically maintain a uniform fluid coupling column between a transducer and a surface portion of the part. The fluid coupling means requires a minimum fluid-flow rate, while permitting use of the unit with rapidly moving parts and also with parts having high temperatures, without affecting the ultrasonic coupling of the transducer to the part.

The invention was evolved with the general object of overcoming the disadvantages of prior fluid-coupled ultrasonic transducer units of the type using a jet of water or other liquid to provide a column between a transducer and the part. The prior art transducers have generally required a large fluid-flow rate and have produced erratic indications, due to variations in the spacing between the transducer and the part and also variations in the angle of the transducer relative to the part. It is also common practice to use a thin film of water or other liquid between the transducer and the part, but the use of a thin film is not satisfactory with rapid relative movement between the transducer and the part, and is also not satisfactory when the part has a high temperature.

According to this invention, an ultrasonic transducer unit is provided having an inlet for connection to a pressurized liquid source and including an end wall having an outer surface in facing relation to a surface portion of the part under test with an opening in the end wall for flow of liquid outwardly between the end wall outer surface and the surface portion of the part. With the liquid being thus forced between the surface portion of the part and the outer surface of the end wall, a static pressure is developed tending to move the transducer unit away from the part. However, due to the rapid movement of the liquid, a Bernoulli effect is produced, and a negative dynamic fluid pressure is produced tending to move the unit toward the part. As a result, a balancing action between static and dynamic fluid pressures is obtained by which the transducer is automatically held with the outer surface of the end wall spaced a short distance from the surface portion of the part, and with a rapidly moving relatively thin stream of liquid. Accordingly, a positive liquid film is obtained of minimum dimensions and with a minimum volume rate of liquid flow. The unit can be used with a system wherein there is rapid relative movement between the transducer unit and the part, as on moving pipe or moving sheet material. In addition, the unit can be used with hot product such as aluminum plate operated at 700 or 800 degrees Fahrenheit, or even higher, because steam bubbles or the like are swept away by the high speed liquid stream and with a minimum amount of liquid being used, the part is cooled to a much lesser degree than would be the case with a conventional water column jet arrangement.

According to an important feature of the invention, the opening is centrally located in the end wall, the end wall and the opening being preferably circular and on a common axis. With this arrangement, the balancing action between the static and dynamic pressures is effective to maintain a substantially parallel relation between the outer surface of the end wall of the casing and the surface portion of the part, to obviate any tilting action. Thus, with the facing surfaces of the end wall and the part being planar, the axis of the unit may be maintained substantially perpendicular to the surface of the part.

Preferably, the diameter of the opening is only a small fraction of the diameter of the end wall, to minimize the fluid flow rate, and to obtain a maximum length of the fluid flow path from the opening to the periphery of the end wall.

A further feature of the invention is in the provision of mounting means supporting the transducer within the casing in spaced relation to the end wall and in alignment with the opening for transmission or reception of ultrasonic waves in a beam through the opening. This arrangement is highly advantageous in that the transducer is spaced away from the part and also in that the transmission or reception of the ultrasonic waves can be confined to a more narrow beam by restricting the size of the opening. When the transducer is used in a pulse-echo system, the unit is preferably so constructed that the distance from the transducer to the surface portion of the part divided by the velocity of ultrasonic wave transmission in the liquid is substantially greater than the maximum thickness of the part divided by the velocity of ultrasonic wave transmission in the part. With this arrangement, it is possible to obviate the effects of multiple reflections on the indicating means of a pulse-echo system.

Further important features of the invention relate to the mounting of the transducer within the casing, and to the provision of a tapered inner surface of the end wall, effective to prevent direct reflection of ultrasonic waves back to the transducer.

This invention contemplates other objects, features and advantages which will become more fully apparent from the following detailed description taken in conjunction with the accompanying drawings which illustrate a preferred embodiment and in which:

FIGURE 1 is a perspective view, showing an ultrasonic testing system utilizing a fluid-coupled transducer unit constructed according to the principles of this invention;

FIGURE 2 is an elevational sectional view of the transducer unit, taken substantially long line II—II of FIGURE 1;

FIGURE 3 is a sectional view taken substantially along line III—III of FIGURE 2; and FIGURE 4 is another sectional view taken substantially along line IV—IV of FIGURE 2.

Reference numeral 10 generally designates an ultrasonic system which incorporates a transducer unit 11 constructed according to the principles of this invention and arranged for testing a part 12 for measurement of dimensions thereof or for detection of defects therein. In the illustrated system, the transducer unit 11 is connected through a cable 13 to an energizing and indicating instrument 14 and is also coupled through a hose 15 to a suitable source of pressurized liquid which may be a source of water, for example.

Referring to FIGURE 2, the transducer unit 11 comprises a casing 16 having a generally cylindrical side wall 17, an end wall 18 disposed with its outer surface 19 in facing relation to a surface portion 20 of the part 12, and a closed end wall 22 at the opposite end thereof. As illustrated, the unit 11 may be operated with the axis thereof in a vertical position, with the end wall 18 constituting a lower end wall and with the end wall 20 constituting an upper end wall. It will be understood, however, that the unit 11 can be operated in other positions.

The casing 16 is provided with a fluid inlet 23 in the side wall 17, coupled through a suitable coupling 24 to the end of the hose 15, so that the casing 16 is filled with the pressurized liquid. The liquid flows out through an opening 26 in the end wall 18 and thence outwardly between the outer surface 19 of the end wall 18 and the facing surface portion 20 of the part 12, the path of flow being indicated by arrows in FIGURE 2.

In operation, if the unit 11 is placed with the surface 19 against the surface portion 20 of the part 12 and water or other liquid is supplied into the casing 16, a static liquid pressure is created to force the unit 11 away from the portion 12, thereby creating the path between surface 19 and surface portion 20 for outward flow of the liquid from the opening 26. Due to the velocity of flow, a Bernoulli or dynamic pressure effect is obtained operating in the opposite direction to produce a force urging the transducer 11 toward the part 12. The dynamic pressure effect is aided by the effect of the weight of the transducer 11, when the transducer is disposed on top of the part. When such effects are balanced, a certain relatively small spacing is obtained between the surface 19 and the surface portion 20 which is automatically maintained substantially constant since movement of the transducer 11 away from the part 12 tends to increase the flow rate and thereby increase the dynamic pressure effect while tending to reduce the static pressure effect. Conversely, movement of the unit 11 toward the part 12 tends to decrease the flow rate and thereby decreases the dynamic pressure effect, while tending to increase the static pressure effect.

The Bernoulli equation is:

$$p + \frac{dq^2}{2} + dv = K$$

where $p$ is the fluid pressure at any point along a stream line, $q$ is the fluid velocity, $d$ is the mass density of the fluid, $V$ is the potential energy of a unit mass of the fluid and $K$ is a constant. This equation may be rewritten in the form:

$$p = K - dV - \frac{dq^2}{2}$$

$V$ may be assumed to be substantially constant and it will be observed that if the velocity $q$ is increased, the pressure $p$ will be decreased. This effect is the effect referred to herein as a dynamic pressure effect.

The static pressure effect referred to herein arises from the fact that the pressure of the liquid within the unit must be greater than atmospheric pressure to cause flow of liquid out of the unit. If the flow is slow, such that the dynamic pressure effect is negligible, the pressure of the liquid between the surface 19 and the surface portion 20 is substantially equal to the pressure within the unit which is greater than atmospheric pressure so that the unit may be forced away from the part 12. If, however, the velocity of flow is increased, the pressure is decreased due to the dynamic pressure effect and when the pressure drops below atmospheric pressure, the unit 11 may be moved toward the part 12, depending upon the magnitude and direction of gravitational or other forces acting on the unit.

In operation, the surface 19 and the surface portion 20 are brought sufficiently close enough together to produce a flow velocity which will cause the dynamic pressure effect to take over and to move the surface 19 still closer to the surface portion 20. However, when the surface 19 is very close to the surface portion 20, the flow is so constricted that the dynamic pressure effect is reduced and the static pressure effect is increased. The spacing is thus determined automatically from a balancing of the two effects.

The action may be likened to the adjustment of a nozzle of a conventional garden hose. When the nozzle is fully open, the mass rate of flow is large but the velocity is relatively low and stream will project a relatively short distance. When the nozzle is adjusted toward a closed position, the velocity may be increased to a point at which the stream is projected a maximum distance. Then when the nozzle is adjusted further toward the closed position, the velocity may be reduced and eventually cut off the flow completely. If one were to measure the pressure within the nozzle, it would be found that the pressure is approximately at its minimum value, substantially less than atmospheric pressure, when the nozzle is adjusted to project the stream a maximum distance. It is also noted that the Bernoulli principle is widely used in venturi mixing or pumping devices and in many other applications.

The exact dimensions are not critical, but it is of course desirable that the flow path between the surface 19 and the surface portion 20 should have a length sufficient to produce a generally laminar flow and a stable dynamic pressure effect, as well as to cause the static pressure effect to be distributed over a substantial area and stabilized, so as to thereby obtain a stable balancing of the two effects.

The balancing action is affected of course by the pressure of the liquid within the casing, the dimensions of the end wall outer surface and of the opening 26 and the magnitude and direction of gravitational and any other forces acting on the unit 11. Also, the initial spacing between the end wall outer surface 19 and the surface portion 20 must be sufficiently small to initially obtain the condition in which the dynamic pressure effect will move the unit toward the part. Satisfactory results are obtained with proportions as illustrated in the drawing with the outer diameter of the casing 16 being on the order of one to two inches. The balance is obtained with a spacing of a few thousandths of an inch between the surface 19 and the surface portion 20.

To increase the length of the flow path without increasing the size of the casing 16, the end wall 18 has a flange portion 27, preferably circular, projecting outwardly in coaxial relation to the casing side wall 17.

It will be noted that the opening 26 is centrally located, both the opening 26 and the periphery of the flange portion 27 of end wall 18 being preferably circular and on a common axis as shown. This feature is important in that a balancing effect is obtained to resist tilting movement of the unit 11, and to maintain the axis of the casing 16 normal to the surface portion 20 of the part 12.

It is also noted that the surface 19 and the surface portion 20 of the part 12 are substantially planar in the illustrated arrangement, which is generally preferable. However, the surface 19 could be contoured to correspond to the non-planar surface of a part to be tested. For example, the surface 19 could be cylindrically concave, to correspond to a portion of the outer cylindrical surface of a pipe of the like.

With the opening 26 being centrally located, and with the above-described balancing action, the liquid flow does not produce any substantial transverse force which might otherwise operate to effect movement of the unit 11 over the surface of the part 12. However, it is a feature of the invention that the fluid-coupling arrangement facilitates rapid relative movement between the unit 11 and the part 12, such as is desirable when testing rapidly moving pipe or sheet stock. A further advantage of the arrangement is that it can be used to test hot product such as aluminum plate at 700 or 800 degrees Fahrenheit or higher, because the rapidly moving liquid stream sweeps away steam bubbles or the like from the region of the opening 26.

A transducer 28 is provided in the form of a piezoelectric crystal plate having a front face 29 for emanating or receiving ultrasonic waves and having a back face 30 which is preferably cemented to one end of a block 31 of acoustically absorbent material. The block 31 is disposed within a cylindrical metal housing 32 which carries a coaxial connector 33, threaded into a mounting member 34. An inner conductor of the coaxial connector 33 is connected to a conductor 35 which is disposed within an insulating disk 36 in the housing 32. Conductor 36 is connected to one end of a lead 38 which extends centrally through the block 31, the other end of the lead 38 being soldered or otherwise connected to a conductive coating forming an electrode on the back face 30 of the crystal transducer 28. A conductive paint 39, such as a silver paint, may be applied to form an electrode on the front face 29 of the crystal 28 and is extended over to the inner surface of the housing 32 to provide an electrical connection through the housing to the outer conductor of the coaxial connector 33. An insulating material 40 may be applied in a thin layer over the electrode 39 on the face 29 of the crystal transducer 28 and may extend to the end of the housing 32, to provide a waterproof assembly.

It will be noted that the housing 32 is coaxially disposed within the casing 16 and that it has an outer diameter which is substantially less than that of the inner diameter of the cylindrical side wall 17 of the casing 16, so as to provide a fluid flow path of annular cross section. To provide for flow of liquid into the path so formed, the mounting member 34 has a plurality of passages 42 therethrough, communicating with the space within the casing 16 into which liquid is supplied through the inlet 23.

To provide for electrical connection of the transducer 28 to the cable 13, a conductor 43 is supported within the number 34 for engagement with the central conductor of the coaxial connector 33 and is insulatingly supported through a water tight connection 44, the conductor 43 being connected through an insulated lead 45 to a central conductor of a coaxial connector 46, for connection to the central conductor of the cable 13.

The unit 11 is usable in a variety of ultrasonic applications, for transmitting or receiving either pulsed or continuous ultrasonic waves. The illustrated unit, however, is particularly designed for use in a pulse-echo system, with the instrument 14 having conventional electronic circuitry for pulsing the transducer and for amplifying and indicating signals produced in response to receipt of echoes by the transducer. Such indicating means may include a cathode ray tube having a face 48 on which spaced "pip" indications are produced in response to reflections from the front and rear surfaces of the part 12, and from flaws or defects therebetween. To prevent the development of improper indications due to multiple reflections between the transducer and the front surface of the part, the travel time of a pulse from the transducer to the front surface of the part 12 should be greater than the travel time in the thickness of the part. Thus a distance $d$ as indicated on the drawing from the transducer to the front surface of the part, divided by the velocity of sound in the liquid coupling medium, should be substantially greater than the thickness $t$ of the part, divided by the velocity of sound transmission in the part.

When the unit 11 is used in a pulse-echo system, and in other applications as well, it is desirable to prevent direct reflections back to the transducer 28 from the surface of the end wall 18. According to a further specific feature of the invention, the wall 18 has a surface 49 which is tapered at an angle such as to prevent such direct reflection back to the transducer 28.

It will be understood that modifications and variations may be effected without departing from the spirit and scope of the novel concepts of the invention.

I claim as my invention:

1. In an ultrasonic system, a transducer unit for transmission or reception of ultrasonic waves into or from a part under test, comprising: a hollow casing having an inlet for connection to a pressurized liquid source and including an end wall having an outer surface in facing relation to a surface portion of the part, said end wall having an opening therein for flow of liquid outwardly in a path between said end wall outer surface and said surface portion of said part, the length of said path of flow from said opening to the periphery of said end wall outer surface being relatively long and sufficient to produce a stable dynamic pressure effect with high velocity of flow and to produce a stable static pressure effect distributed over a substantial area with the pressure of the liquid within said casing, the dimensions of said end wall outer surface and of said opening, the initial spacing between said end wall outer surface and said surface portion of said part and the magnitude and direction of gravitational and any other forces acting on said transducer unit being such as to automatically maintain a certain spacing between said end wall and said surface portion of said part by means of a balancing action between static and dynamic fluid pressures, and an ultrasonic transducer within said casing for transmission or reception of ultrasonic waves through the liquid into or from said surface portion of the part.

2. In an ultrasonic system as defined in claim 1, said opening being centrally located in said end wall whereby said balancing action between said static and dynamic fluid pressures is effective to maintain a substantially parallel relation between said outer surface of said end wall and said surface portion of said part.

3. In an ultrasonic system as defined in claim 2, said end wall and said opening being substantially circular and having a common axis with the diameter of said opening being a small fraction of the diameter of said end wall.

4. In an ultrasonic system as defined in claim 1, mounting means supporting said transducer within said casing in spaced relation to said end wall and in alignment with said opening for transmission or reception of ultrasonic waves in a beam through said opening.

5. In an ultrasonic system as defined in claim 4, said end wall having a tapered inner surface effective to prevent direct reflection of ultrasonic waves back to said transducer.

6. In an ultrasonic system as defined in claim 4, said mounting means being disposed between inlet and said end wall and having a plurality of openings therein for flow of liquid from said inlet around said transducer and to said opening.

7. In an ultrasonic system as defined in claim 4, for testing of a part in the form of a plate or the like having a certain maximum thickness, pulse-echo means for pulsing said transducer to transmit pulses of ultrasonic waves into the part and to indicate signals generated by said transducer in response to echoes received from the part, the distance from said transducer to said surface portion of the part divided by the velocity of ultrasonic wave transmission in said liquid being substantially greater than said maximum thickness of the part divided by the velocity of ultrasonic wave transmission in the part.

8. In an ultrasonic system as defined in claim 4, said mounting means comprising a block of ultrasonic wave-absorptive material, and said transducer being in the form of a plate of piezoelectric material cemented to one end of said block.

9. In an ultrasonic system as defined in claim 8, said casing having a generally cylindrical side wall and said block being generally cylindrical and being supported in coaxial relation within said cylindrical side wall, the outer diameter of said block being substantially less than the inner diameter of said side wall to provide a liquid passage of generally annular cross-section.

10. In an ultrasonic system as defined in claim 1, said casing having a generally cylindrical side wall and said end wall including a circular flange portion projecting outwardly from one end of said side wall in coaxial relation thereto.

References Cited

UNITED STATES PATENTS 3,255,626  6/1966  Van Der Veer ____ 73—67.8 XR

FOREIGN PATENTS 255,105  2/1963  Australia.

RICHARD C. QUEISSER, Primary Examiner

JOHN R. FLANAGAN, Assistant Examiner

U.S. Cl. X.R.

73—71.5